A. SOBANSKI.
FISHHOOK.
APPLICATION FILED MAY 16, 1919.

1,322,365.

Patented Nov. 18, 1919.

WITNESSES
J. Philip Hofmann
Walton Harrison

INVENTOR
Antoni Sobanski
BY
ATTORNEYS

UNITED STATES PATENT OFFICE.

ANTONI SOBANSKI, OF VANCOUVER, BRITISH COLUMBIA, CANADA.

FISHHOOK.

1,322,365.   Specification of Letters Patent.   Patented Nov. 18, 1919.

Application filed May 16, 1919. Serial No. 297,539.

*To all whom it may concern:*

Be it known that I, ANTONI SOBANSKI, a citizen of Poland, and a resident of Vancouver, British Columbia, Dominion of Canada, have invented a new and Improved Fishhook, of which the following is a full, clear, and exact description.

My invention relates to fish hooks of the kind in which a plurality of barb points are movable relatively to each other in order to secure an effective grip upon the fish.

Reference is made to the accompanying drawing forming a part of this specification and in which like letters indicate like parts throughout the several figures.

Figure 1:
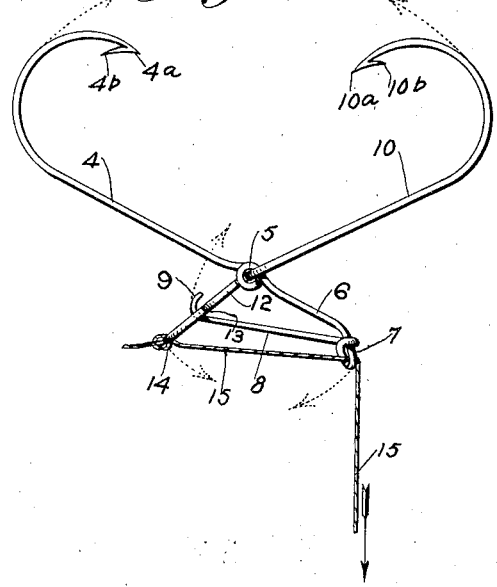
Figure 1 is a plan view of my improved fish hook, showing it as ready for use except that it is unbaited.
Figure 2:
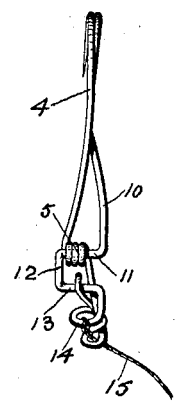
Fig. 2 is a side elevation of the device shown in Fig. 1.

A shank 4 is provided with a point $4^a$ and with a barb $4^b$. This shank is also provided with a helix 5 serving as an eye bearing. The shank is further provided with a portion 6 extending from this bearing and bent to form another eye 7. From this last mentioned eye an arm 8 projects and is provided at its outer end with a reverting portion 9. Another shank 10 provided with a point $10^a$ and barb $10^b$ is bent so as to form a bearing portion 11, this portion extending through the helix 5. The shank 10 is further provided with an outwardly extending portion 13 and with an eye 14. A fishing line is shown at 15 and extends through the eye 7 being tied to the eye 14 and so arranged that when there is a sharp pull upon the line, the eyes 14 and 7 force toward each other.

Figure 3:
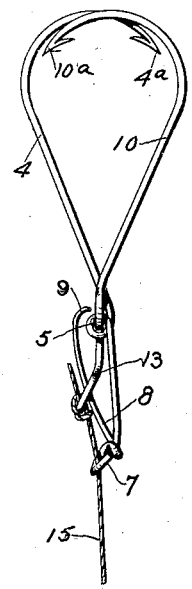
Fig. 3 shows the device with the hooks closed.

The arm 8 is so arranged that it normally engages the portion 13 and presses gently against this portion. As a result of this action the arm 8 has a tendency to cause the shanks 4, 10 to assume the relative positions indicated in Fig. 1. The pressure of the arm 8 upon the portion 13 tends to hold the apparatus in this position. When, however, there is a sharp pull as between the line 15 and either one of the shanks 4 or 10, the eyes 7, 14 carried by the different shanks which force together so that the points $4^a$, $10^a$ approach and pass each other as may be understood by contrasting Figs. 1 and 3. When this pull is given, the portion 13 of the shank 10 simply slides along the adjacent inner face of the arm 8 until the portion 13 passes a dead center after passing which the pressure on the arm 8 causes the points $4^a$, $10^a$ to be sprung quickly together. In other words, the arm 8 is a spring arm which normally holds the points $4^a$, $10^a$ apart as shown in Fig. 1, but under other conditions causes these points to be sprung together and cross each other as indicated in Fig. 3.

In practice, bait may be placed upon either of the shanks 4, 10 or upon both of them. I find it often advantageous, however, to place the bait upon the shank 10 and preferably at a point not too far from the barb $10^b$.

The movements of the various parts relatively to each other are indicated by dotted lines in Fig. 1.

The operation of my device is as follows: The hook being baited as above described is thrown into the water and may be trailed upon the bottom or allowed to hang downwardly or if the bait be light and used in connection with a sinker, the device may be caused to float above the sinker.

A fish sees the bait located, we will say, upon the shank 10, and gives the same a sharp pull. The result is that the portion 13 of the shank 10 is caused to slide along the inner surface of the spring arm 8 so that the points $4^a$ and $10^a$ are brought together abruptly as with a snap, due to the pressure of the spring arm 8 upon the portion 13 of the shank 10. Thus, the points $4^a$ and $10^a$ are thrust into the fish's head or body and the fish is unable to escape.

I do not limit myself to the precise mechanism shown as variations may be made therefrom without departing from the spirit of my invention.

Having thus described my invention what I claim as new and desire to secure by Letters Patent is as follows:

1. A device of the character described comprising a pair of shanks pivotally connected together and movable relatively to each other, each shank carrying a point and a barb, one of said shanks being provided with a cross portion and the other of said shanks being provided with a spring arm slidably engaging said cross portion, the shanks having two different normal positions controllable by the pressure of said spring arm upon said cross portion.

2. A device of the character described comprising a pair of shanks journaled relatively to each other and each carrying a point and a barb, one of said shanks being prolonged and provided with an eye and with a spring arm projecting from said eye, the other of said shanks being prolonged and provided with an eye and with a cross portion engaged by said spring arm, said eyes being so arranged that a fishing line may be threaded through one of said eyes and secured to the other eye, said spring arm being so prolonged and arranged as by its pressure to hold said shanks in either of two normal positions.

3. A device of the character described comprising a shank provided with a point and also provided with an eye serving as a bearing and with another eye adapted for attachment to a line, said shank being also provided with a portion extending from said last-mentioned eye and formed into a spring arm, and a second shank extending through said first mentioned eye and journaled thereto, said second shank being provided with a point and with a cross portion slidably engaging said spring arm and provided further with an eye adapted for attachment to a line.

ANTONI SOBANSKI.